United States Patent
Ogasawara

(10) Patent No.: US 6,671,877 B1
(45) Date of Patent: Dec. 30, 2003

(54) METHOD AND DEVICE TO CALCULATE ACTIVITY DEGREES OF METHOD PROGRAMS

(75) Inventor: Takeshi Ogasawara, Hachioji (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/493,768

(22) Filed: Jan. 28, 2000

(30) Foreign Application Priority Data

Jan. 29, 1999 (JP) .......................................... 11-022030

(51) Int. Cl.[7] .............................. G06F 9/45; G06F 9/44
(52) U.S. Cl. ...................... 717/158; 717/108; 717/116; 717/148
(58) Field of Search ................................ 717/106, 108, 717/116, 124, 127, 140, 148, 165, 151, 153, 158

(56) References Cited

U.S. PATENT DOCUMENTS

| | | | | |
|---|---|---|---|---|
| 5,933,635 A | * | 8/1999 | Holzle et al. ................ | 717/151 |
| 6,105,033 A | * | 8/2000 | Levine ........................ | 707/101 |
| 6,110,226 A | * | 8/2000 | Bothner ...................... | 717/153 |
| 6,226,783 B1 | * | 5/2001 | Limondin et al. .......... | 717/104 |
| 6,412,107 B1 | * | 6/2002 | Cyran et al. ................ | 717/148 |
| 6,507,946 B2 | * | 1/2003 | Alexander et al. .......... | 717/145 |

FOREIGN PATENT DOCUMENTS

| | | | | |
|---|---|---|---|---|
| JP | 07210424 | 8/1995 | ........... | G06F/11/28 |
| JP | 11212837 | 8/1999 | ........... | G06F/11/34 |

* cited by examiner

*Primary Examiner*—Anthony Nguyen-Ba
(74) *Attorney, Agent, or Firm*—Roy W. Truelson

(57) ABSTRACT

To provide a method for calculating an activity degree of a method in order to effectively select a method for discarding a code. At a compilation time, a calling map concerning method calls which may happen in a method is generated and stored into a storage, and a code for recording method calls which are actually issued is generated and stored into a storage. To discard a code in such a state, all threads are temporarily stopped and the activity degree of methods indicating a possibility that the methods are actually called is calculated. At this time, a second method which has a high possibility that the second method is actually called from a first method corresponding to a stack frame is specified and stored into a storage by using the calling map and information concerning method calls which are actually issued for the first method, and an activity degree of the second method is updated by operating a priority corresponding to the number of stages of the stack frame corresponding to the first method from the top of a stack to the activity degree of the second method. Suitably, such a process is repeated. Thereafter, any code of a low activity degree is discarded.

8 Claims, 6 Drawing Sheets

METHOD AND DEVICE TO CALCULATE ACTIVITY DEGREES OF METHOD PROGRAMS

DETAILED DESCRIPTION OF THE INVENTION

1. Field of the Invention

The present invention relates to a method for calculating an activity degree of a method in order to effectively select a method for discarding a code.

2. Background of the Invention

Presently, Java™ is widely used not only as a common language for network computing but also as a standard object-oriented language not dependent on any platform. A program written in Java™ is translated into a bytecode which is executed by a Java™ virtual machine. Accordingly, a program once written in Java™ has an advantage that it operates on any computer supporting Java™ regardless of its CPU.

Despite execution of a bytecode by a virtual machine is inferior to direct execution of a machine language code in terms of execution performance. Thus, in general, the bytecode is translated into a machine language code (hereafter referred to as "JITed code") by a JIT compiler during operation of a Java™ program as to execute a JITed code instead of a bytecode. The minimum unit of compilation is a subroutine called a method. A frequently executed code is translated into a machine language so that performance of a machine language code may be exploited while preserving multi-platform characteristics of a Java™ bytecode.

A JITed code for a method is equal to an optimization code generated by a C compiler and so on on the point of being a code suited to a CPU on which a program operates. In general, in the currently popular CPUs, if a subroutine is invoked, the subroutine forms a stack of an area (referred to as a "frame") for storing a local variable to be used by itself. FIG. 1 shows a state of a stack when subroutine A has invoked subroutine B and subroutine B has invoked subroutine C. In this drawing, the stack extends upward. The areas represent respective frames of the subroutines. When returning from each subroutine, its frame is removed. In the case of Java™, CPU resources are allocated to each executable unit called a thread which has its own stack (referred to as a "thread stack"). A JITed code creates the above-mentioned frame (hereafter referred to as "JITed frame") on a thread stack.

While, in most cases, a method is initially executed by an interpreter, it is compiled by a JIT compiler if determined that it is executed more than a certain level in terms of execution frequency or execution time. Once generated, JITed codes are managed in memory. The time when a Java™ system assures that they can be safely discarded is when the Java™ system discards a class (hereafter "class unload") by garbage collection (hereafter "GC").

There are cases where, if the memory used by a JIT compiler including a JITed code is limited or to be limited, only class unload is not sufficient. For instance, in a desktop environment where operation is on a thin client without any virtual memory by a hard disk such as a network computing machine (hereafter an "NC machine"), memory limitation is a realistic problem. In such a desktop environment, multiple Java™ applications such as a mail, a word processor, and a scheduler are simultaneously activated and thousand of types of methods may be invoked, though a significant percentage of those methods are not present (are not active) in each thread stack. Since class unload only discards a class and its method with no possibility of being fully used in a Java™ system, a JITed code of such a nonactive method is not discarded. Thus, a JIT compiler has a mechanism of JITed code discarding.

In a current context (a program counter) or a stack pointer of a thread during execution and the like (copies of CPU resources) or a frame of a JITed code held in such a thread stack, an active method in the thread is recorded. If a JITed code of an active method is discarded, a thread cannot be executed. Accordingly, it is a nonactive JITed code that is discarded. The easiest way of discarding in JITed code discarding is to discard all nonactive JITed codes. However, this method is wasteful since more than necessary JITed codes are discarded. Since optimizing compilation of a method takes time, they should be selectively discarded under a policy of "a method to be promptly executed is not discarded." As an example of an effect of accurate selection, it is assumed that there are method A wherein JITed code discarding is performed now and immediately executed and method B wherein it is executed then minutes later. If A is discarded, the amount of memory of a JITed code of A which was just discarded and the amount of memory necessary for compilation work of A must be immediately secured. On the other hand, if B is discarded, the amount of memory of a JITed code of B becomes available memory for ten minutes. In reality, multiple JITed codes equal to the necessary amount of free memory are discarded. While an ideal policy of discarding is to discard JITed codes to be no longer used, such information is normally unavailable. It is more realistic to infer it and discard them in order of the least recently used method. Hereafter, it is called the JITed code discarding policy.

There are execution frequency (how many times it was called) and execution time (the time a program counter was pointing the method) among normally thinkable profiles of a method. Collection of execution frequency is performed by increasing a counter of a method every time the method is called. If the method is compiled by a JIT compiler, updating of execution frequency measured by an interpreter until then is terminated, so execution frequency information for a JITed code cannot be obtained from the interpreter. To obtain execution frequency information for a JITed code, it is necessary to count execution times at a prologue of a JITed code of each method. For instance, on a x86 platform, inc dword ptr [counter address] instruction is added. Collection of execution time is performed by interrupting (typically timer interruption, or executable instructions interruption depending on a processor) at regular intervals and collecting program counters (hereafter "pc").

If these conventional profiles are used as a JITed code discarding policy, a problem arises. First, as to execution frequency, it is a problem to refer to memory and count it each time a JITed code of each method is executed because it causes overhead to a state where memory is not exhausted. Moreover, there is a possibility of mistakenly discarding a method with low frequency but to be immediately called. Since what is necessary is a JITed code occupying memory without being called, it is beside the object. Also, as to execution time, interruption and management of collected pc (cost of association if immediately associated, or retention if not) are problematic because they cause overhead to a state where memory is not exhausted. In addition, similar to the case of collecting execution frequency, there is a possibility of mistakenly discarding a method with short execution time but to be immediately called.

As mentioned above, it is irrelevant to adopt a conventional profile method as a JITed code discarding policy, and it may cause an inadequate JITed code discarding. An object of the present invention is to provide a method for calculating an activity degree of a method representing how readily it can be performed in order to effectively select a method for discarding a code.

SUMMARY OF THE INVENTION

To attain the above object, at a compilation time, the present invention generates and stores into a storage a calling map concerning a method call which may happen in a method, and generates and stores into a storage a code for recording a method call which is actually issued. This calling map is organized, for a certain address in a method, to be suitable for outputting any method call which may happen from the address onward. However, it is also possible to output method calls for each method. Once compilation ends and a generated code is executed, a calling map concerning method calls which may happen in a method and information concerning method calls which are actually issued are recorded for each method.

To discard a code in such a state, all threads are temporarily stopped and the activity degree of each method indicating a possibility that the method is actually called is calculated. At this time, a second method which has a high possibility that the second method is actually called from a first method corresponding to a stack frame is specified and stored into a storage by using the calling map and information concerning method calls which are actually issued for the first method, and an activity degree of the second method is updated by operating a priority corresponding to the number of stages of the stack frame corresponding to the first method from the top of a stack to the activity degree of the second method. Suitably, such a process is repeated. Namely, a third method which has a high possibility that the third method is actually called from the second method is specified and stored into a storage by using the calling map and information concerning method calls which are actually issued for the second method, and an activity degree of the third method is updated by operating a priority corresponding to the number of stages of the stack frame corresponding to the first method from the top of a stack to the activity degree of the third method. A code of any method acquired in this way whose activity degree is low is discarded so as to enable more efficient code discarding.

Moreover, suitably, a calling map outputs to a certain address in a method a method call which may happen from the address onward, and a second method is specified by using a method call which may happen from the execution restarting address of a first method onward.

The present invention seeks by utilizing a current context, a program structure, and execution time information a degree of how readily a nonactive method is called (an activity degree). Utilization of a current context referred to here means being possible to determine that the higher (near the top) order a method has in a stack, the earlier it is to be executed. Utilization of a program structure means knowing for a control flow methods likely to be called from now on out of those temporarily stopped. Utilization of execution time information means that even the method likely to be called (including an interpreter) may be excluded from determination subjects if not called at all at runtime. An activity degree of a method likely to be called early is raised according to how early it is called.

Thus, as to an activity degree, the earlier re-execution time of a method is, the larger its value becomes. This is good in terms of well imitating the above-mentioned JITed code discarding policy. In the case of the aforementioned example, if A and B are the methods called from a high order and a low order in a stack respectively, A's activity degree becomes higher than that of B due to algorithm of the present invention, so there will be no case where A is selected and discarded prior to B.

If a memory request of a JIT compiler cannot be met in a certain thread, the thread temporarily stops all the threads other than itself and locates active methods. A method for calculating an activity degree of a method of the present invention is used to decide an activity degree of each method. Thereafter, based on such an activity degree, some or all of JITed codes of a nonactive method are discarded. All temporarily stopped threads are restarted and memory is requested again. This is repeated until the memory request is met. If the memory request is not finally met, and if allowed, an optimization level of the compiler is lowered and compilation is challenged again. If compilation is not allowed agin, or if compilation is not possible even at the lowest optimization level, this method is not compiled.

To reduce working cost for calculating activity degrees of methods, an upper limit may be set to frequency of operation for their activity degrees to be operated to an activity degree of any method further called by them.

PREFERRED EMBODIMENTS

The present invention is a method for giving a method a priority called an activity degree in order to imitate a JITed code discarding policy. A JITed code discarding policy is "to discard JITed codes that are not expected to be used immediately." It can be expected that a method of a low activity degree will not be called for awhile. If Ted codes of methods not called for awhile are discarded, the amount of free memory used by them should be available for a long time.

Figure 1:
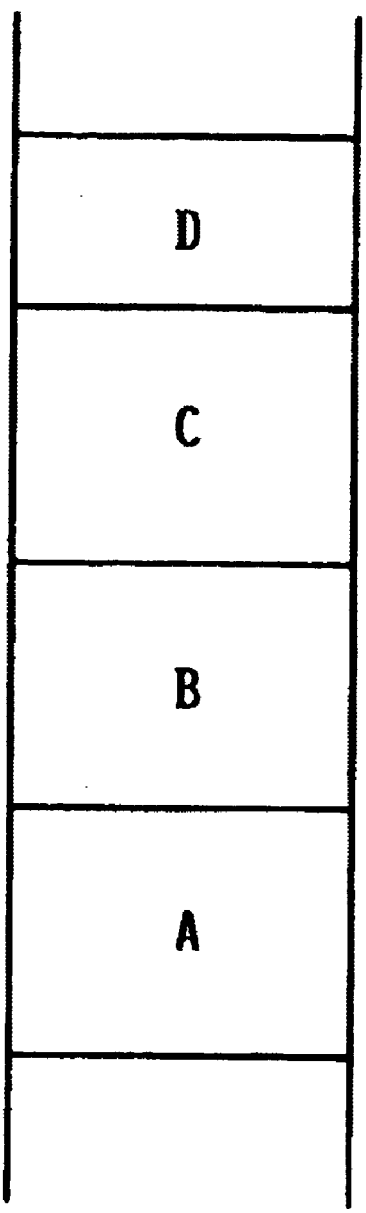
FIG. 1 is a diagram showing a stack when subroutine A has invoked subroutine B and subroutine B has invoked subroutine C.
Figure 2:
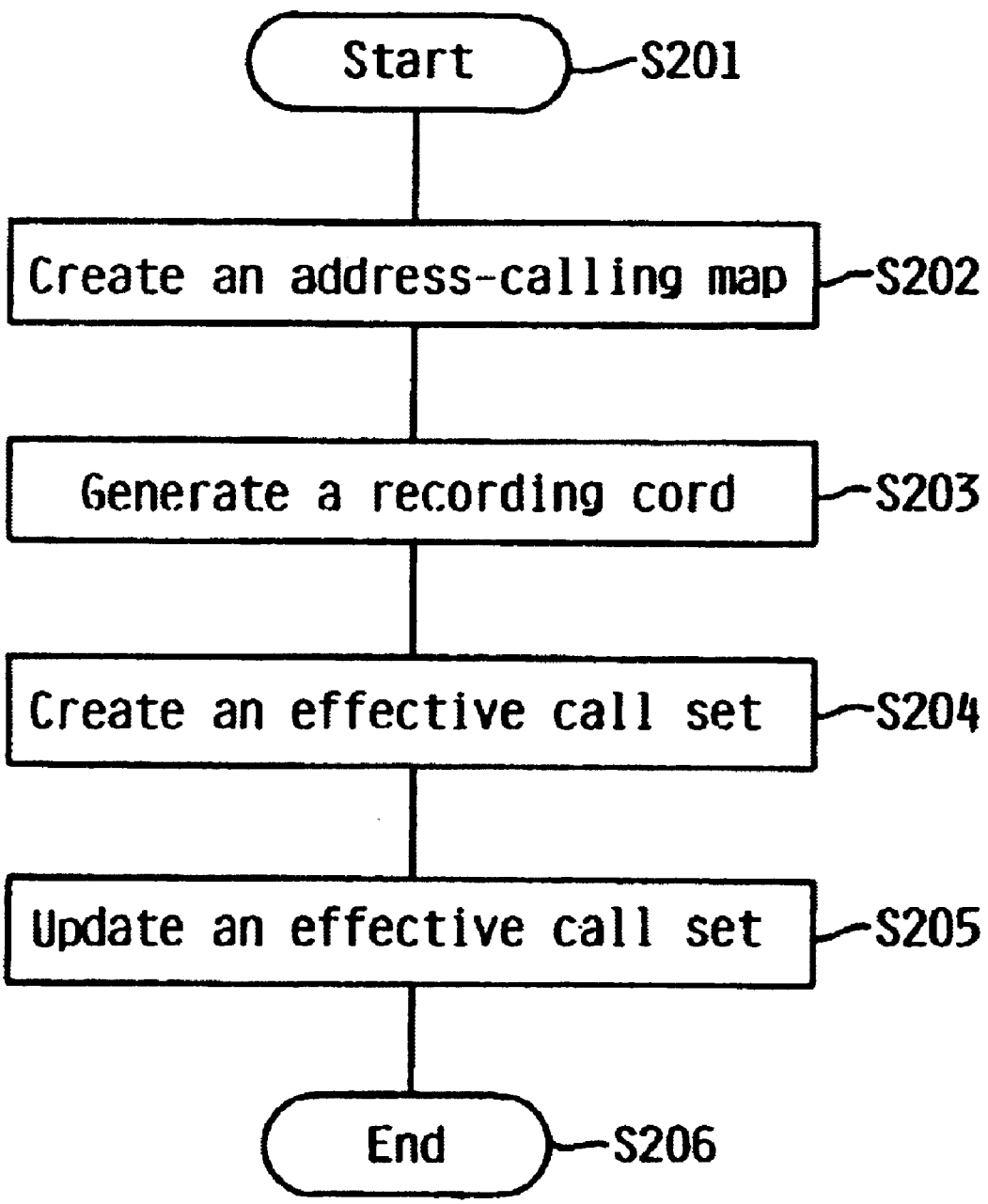
FIG. 2 is a flowchart describing JIT compilation of a method for calculating an activity degree of a method in the present invention and its operation at an execution time.

The following shows a procedure for calculation of activity degree A(m) of method m. An initial value of an activity degree of each method is 0. First, compilation by a JIT compiler and its operation at runtime are described by referring to a flowchart in FIG. 2. It starts with step S201, and in step S202, for method m, creates address-calling map $MAP_{A-f}(m)$ for associating address addr in a JITed code and a method set called (or may be called) when execution of a method is restarted from this address. An address-calling map associates basic block BB including addr with method calls which are reached from this BB on the control flow. This address-calling map, when a certain address addr is given, return all method calls reached from this addr. The all method calls are referred to call set $SET_{A-f}(m, addr)$.

Figure 3:
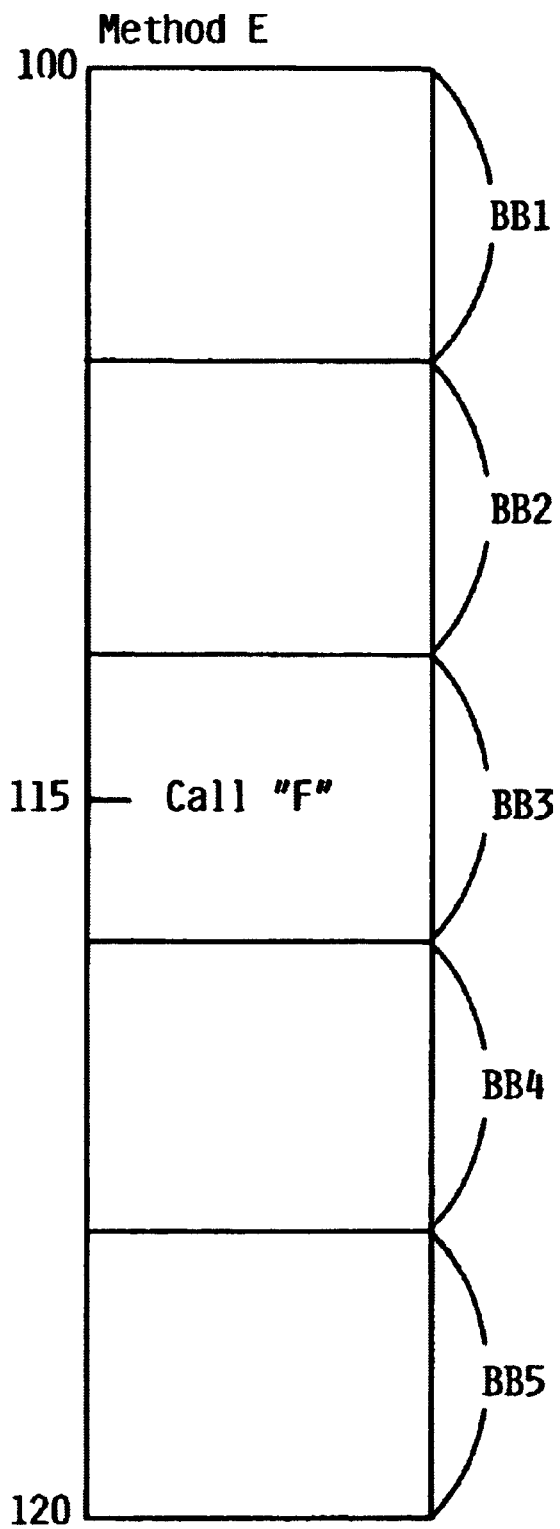
FIG. 3 is a diagram showing a JITed code of Method E.

To calculate an address-calling map, a control flow is analyzed, and addresses of method calls which a basic block BB may reach are collected for each BB. Then, relational data of BB's starting address i_addr and calling address of a reached method i_call (for instance, a table sorting i_addr, i_call) is affixed to a compile code. A call set is all i_call associated with a BB including addr. FIG. 3 is a diagram showing a JITed code of method E. Method E comprises BB1 to BB5. In this diagram, method F is called at address 115. Accordingly, as to a call set, addr=100 to 115 returns F and addr=116 to 120 returns nothing.

To significantly reduce cost for calculating an address-calling map, though not accurate, an address-calling map of method m can be made a set of all method calls included in m. In this case, a call set is also a set of all method calls included in m.

A call instruction for calling a method in a JITed code is processed so that it becomes a direct call if possible for optimization. For instance, if a method called is not yet compiled when compiling a certain method call, a compiler cannot generate a direct call instruction. If such a method call happens, a jump is made to a back patch code, and it is established that a target address generated by a JIT compiler may be used from a next method call onward. Such a process has been conventionally performed. In the present invention, when initially performing a method call, whether a target address is generated or not yet, a jump must be made to a back patch code and have the target address recorded (using code from S203). For a method call from the second time onward, a jump to a back patch code is not necessary.

In step 203, a code for recording actual happening of a call by each call code is generated in a back patch code of a method call. This record is called effective call set $SET_{EI}$ (m). This effective call set is a set of pairs of a calling address and a target address (ei_call, ei_target). An initial value of ei_target is NULL. An element whose ei_target is not NULL is a significant element.

In step 204, when compiling a method, a compiler creates a table of all target addresses (ei_call, ei_target) and affix it to a compile code. For instance, it is as in Table 1.

TABLE 1

| ei_call | ei_target |
|---------|-----------|
| xxxx    | null      |
| yyyy    | null      |
| zzzz    | null      |

This table becomes an effective call set. A process at a compilation time is as above.

If a JITed code is executed and a code generated in S203 is executed, ei—target of an entry (ei_call, ei—target) associated with an effective call set of a method called is updated in step S205. Here, only a call which has an actual target address in ei_target in an effective call set is an effective call which actually performs a call. In step S206, the process ends. Moreover, Table 1 becomes like Table 2 for instance.

TABLE 2

| ei_call | ei_target |
|---------|-----------|
| xxxx    | null      |
| yyyy    | aaaa      |

TABLE 2-continued

| ei_call | ei_target |
|---------|-----------|
| zzzz    | null      |
| kkkk    | bbbb      |

Figure 4:
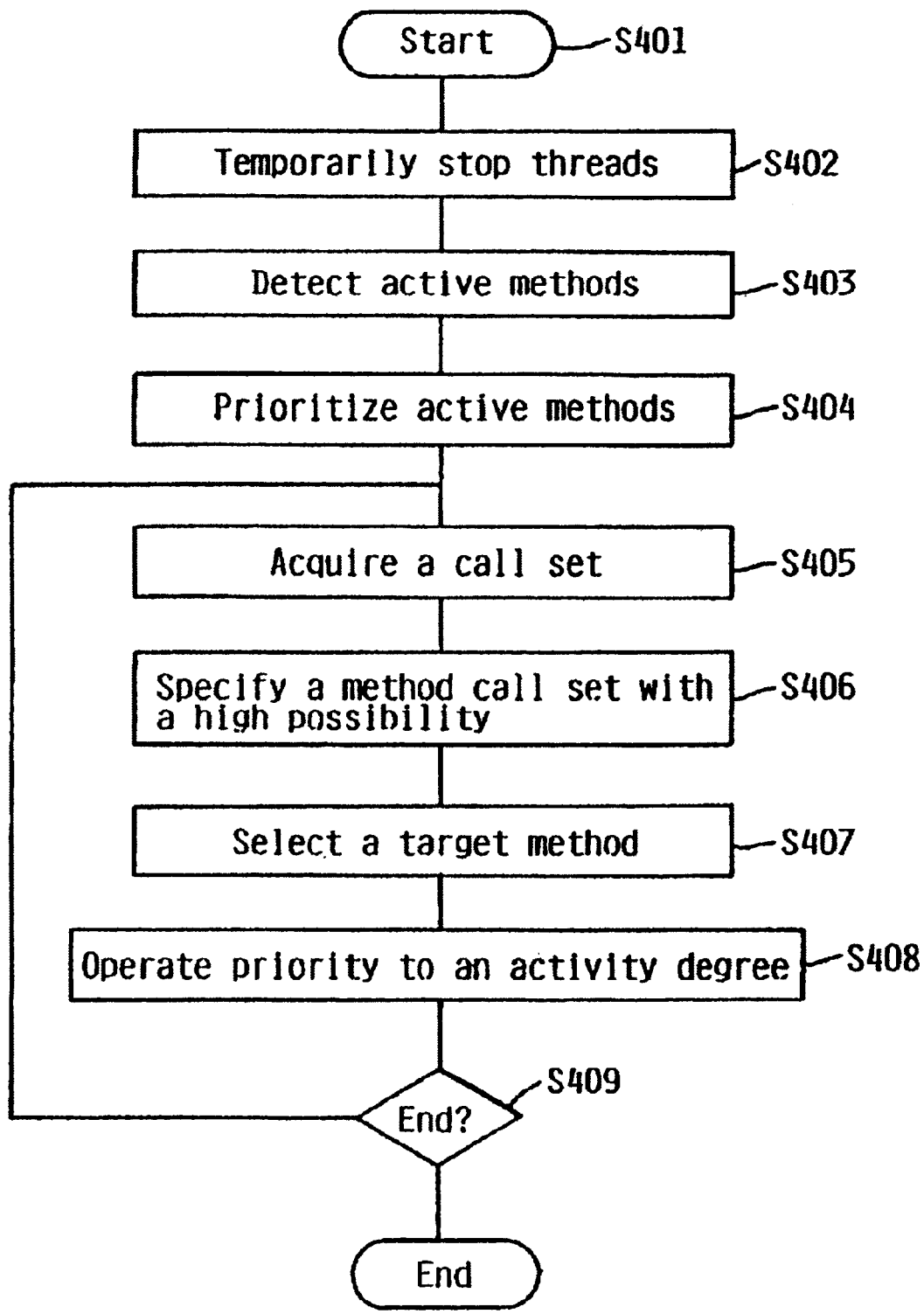
FIG. 4 is a flowchart describing operation during a discarding process of a JITed code of a method for calculating an activity degree of a method in the present invention.

Next, an activity degree of a method is decided during a discarding process of a JITed code (all threads are temporarily stopped). It is described as follows by referring to a flowchart of FIG. 4.

If a memory limit is reached during compilation in step S401 the JIT compiler temporarily stops threads in operation in step S402.

In step S403, in each thread, a frame of a JITed code is retrieved from a ceiling to a bottom of a stack. A method corresponding to a located JITed code is called active method $m_0$.

In step S404, active methods $m_0$, are prioritized. It is assumed that priority of a method which is i-th (i>=0) toward a bottom from a method closest to a ceiling is w(i). Here it is assumed w(i)>(i+1). For instance, $w(i)=0.9^i$.

In step S405, for each active method $m_0$, by using its stop address addr (if temporarily stopped on that very method, a program counter value (pc) of its context, otherwise a next pc saved in a frame), address-calling map $MAP_{A-I}(m_0)$ is subtracted to acquire call set $SET_{A-I}(m_0, addr)$.

Effective call set $SET_{EI}(m_0)$ of method $m_0$ is further referred to in step S406, and $SET_{A-EI}(m_0, addr)$ is acquired in step S407. $SET_{A-EI}(m_0, addr)$ is a set of a method call which may actually be executed from $m_0$ when restarting execution from addr of $m_0$ and an address of target method $m_1$ called by this method call. $SET_{A-EI}$ is stored in memory.

In step S408, priority w(i) of $m_0$ is operated (for instance, addition) to activity degree $A(m_1)$ for all target methods $m_1$ included in $SET_{A-EI}(m_0, addr)$. This is represented as Update A ($m_1$, w(i)).

Likewise, when $m_1$ is called, a set of target methods $m_2$ which are highly likely to be called by $m_1$ are provided in effective call set $SET_{EI}(m_1)$. And in addition, Update A ($m_2$, w(i)) is performed to all target methods $m_2$ that belong to $SET_{EI}(m_1)$. Likewise, Update A(m, w(i)) is repeated to target methods from there onward until all the methods are covered. Namely, S405 to S408 are repeated until Update A(m, w(i)) is performed to all the methods after S408 or until it is repeated the predetermined number of times.

Figure 5:
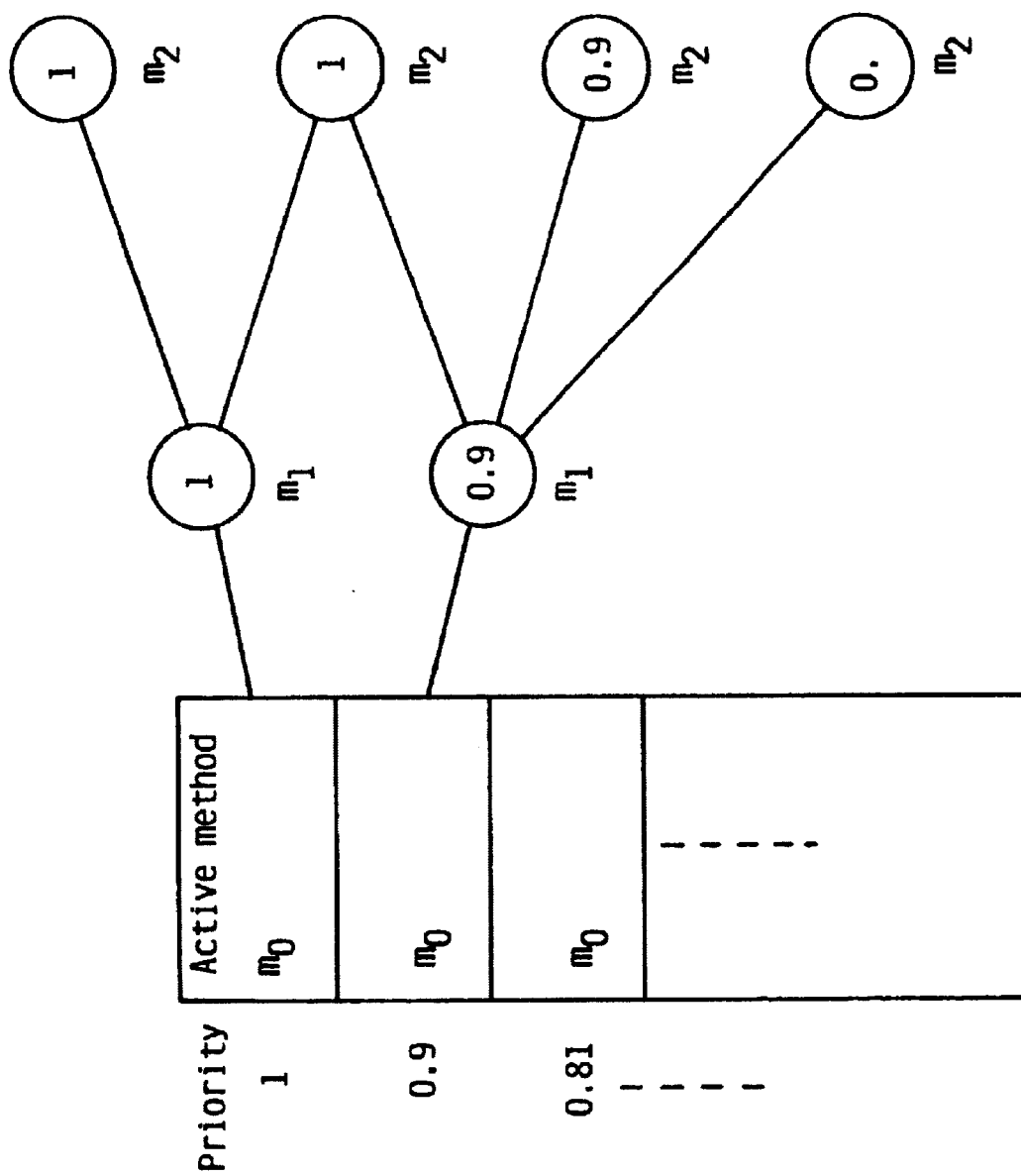
FIG. 5 is a diagram describing allocation of activity degrees to target methods.

FIG. 5 is a diagram for describing allocation of activity degrees to target methods. To each active method $m_0$ of a stack of this thread, priorities w of 1, 0.9, and 0.81 are allocated in downward order from a ceiling of a stack. Priority w of $m_0$ is reflected on an activity degree of $m_1$ which is directly called by these active methods. Moreover, an activity degree (priority) of $m_1$ is reflected on an activity degree of $m_2$ which is called by $m_1$. However, if activity degrees are propagated from two or more methods, as shown in FIG. 5, it is also possible to take a larger value compared with a value being held. Furthermore, it is also thinkable to make an activity degree lower as it is traced to the right each time in FIG. 5. In addition, it is also possible to define an update process such as Update $A(m_x, m_{x-1})$ instead of Update A(m, w(i)).

As above, an activity degree is allocated to all the methods. A JIT compiler discards JITed codes whose activities are lower, restarts thread execution, and continues compilation.

If this working cost is a problem, it is also possible to set an upper limit to the number of times of updating priority (the number of times of executing Update A(m, w(i)) in each thread.

Moreover, as to a thread blocked in a synchronized method or a thread of low priority, it is possible not to collect an activity degree considering that, even if thread execution is restarted in S409, it is not dispatched for awhile.

While a flow of processing of the present invention is explained as above, the present invention can also be implemented by a device for implementing these processes or in a form of a program for having a computer implement these processes. Storing of this program on storage media such as a floppy disk and a CD-ROM or any other form of storage is normally performed by one having ordinary skill in the art.

Figure 6:
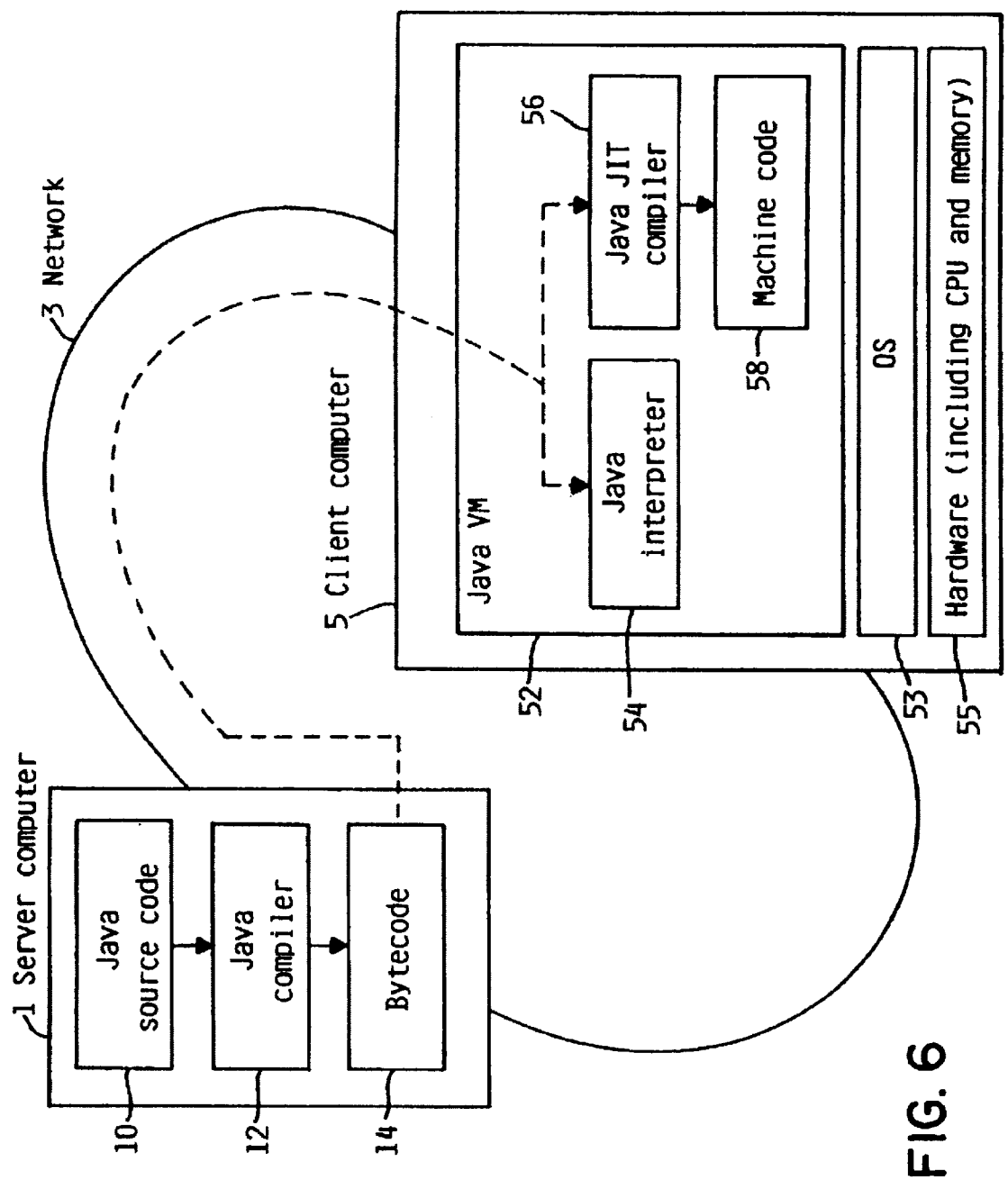
FIG. 6 is a drawing showing an example of device configuration in the present invention.

Here, an example of device configuration related to the present invention is described by using FIG. 6. Server computer 1 and client computer 5 are connected via network 3. Client computer 5 comprises Java™ VM (virtual machine) 52, OS (operating system) 53, and hardware (including CPU and memory) 55. Moreover, Java™ VM 52 comprises Java™ interpreter 54 and Java™ JIT compiler 56. Java™ VM 52 further comprises a garbage collector and a stack tracer which are not illustrated. Meanwhile, client computer 5 may be, other than an ordinary computer, a so-called network computer or a home information appliance which has a smaller size of memory or does not include any auxiliary storage such as a hard disk.

On server computer 1, Java™ source code 10 is compiled by Java™ compiler 12. The result of this compilation is bytecode 14. This bytecode 14 is sent to client computer 5 via network 3. Bytecode 14 is a native code for Java™ Virtual Machine (Java™ VM) 52 installed on a WWW browser (World Wide Web Browser) in client computer 5, etc., and Java™ interpreter 54 or Java™ JIT compiler 56 is used when actually executed on the CPU of hardware 55. Interpreter 54 decodes bytecode 14 at an execution time, and invokes and executes a processing routine prepared for each instruction. On the other hand, JIT compiler 56 translates a bytecode to machine code 58 by using a compiler in advance or immediately before execution and then executes it on the CPU.

ADVANTAGES OF THE INVENTION

As the present invention enables a method for discarding a code to be effectively selected, frequency of recompile of an identical method could successfully be lowered and compile overhead reduce.

DESCRIPTIONS OF THE SYMBOLS

1: Server computer
3: Network
5: Client computer
10: Java™ source code
12: Java™ compiler
14: Bytecode
52: Java™ VM
54: Java™ interpreter
56: Java™ JIT compiler
58: Machine code
60: Garbage collector
53: OS
55: Hardware (including CPU and memory)

What is claimed is:

1. A computer-implemented method for managing discarding of compiled code in a system employing JIT compilation, said computer-implemented method comprising the steps of:

compiling a plurality of methods using a JITcompiler, said compiling step including generating and storing a respective calling map corresponding to each of said plurality of methods, each respective calling map identifying methods which are callable from the method corresponding to the respective calling map;

determining that at least one of said plurality of methods compiled by said compiling step should be discarded;

responsive to said determining step, identifying a first subset of said plurality of methods compiled by said compiling step, each method of said first subset being an active method corresponding to a respective stack frame in a stack, and determining a respective priority of each respective method of said first subset, said respective priority corresponding to the number of stages from the top of the stack to the stack frame corresponding to the respective method in which the stack frame corresponding to the respective method resides;

identifying a second subset of said plurality of methods compiled by said compiling step, said second subset containing methods which are callable from at least one method of said first subset, said second subset being identified by using said calling map and information concerning a method call which is actually issued for said first subset;

updating a respective activity degree of each respective method of said second subset as a function of the priority corresponding to a method of said first subset from which the respective method of said second subset is callable; and selecting at least one method of said plurality of methods compiled by said compiling step for discarding based on said activity degree of each respective method.

2. The method of claim 1 wherein said calling map is configured to identify, corresponding to an index address in said method, any method which is callable from said index address onward, and identification of said second subset of methods is performed by using a respective execution restarting address of each method of said first subset as an index address for the corresponding calling map.

3. The method of claim 1, wherein said JIT compiler is a JAVA JIT compiler which compiles JAVA byte code.

4. The method of claim 1, wherein said priority is of the form: $K^i$, where K is a positive constant less than one, and i is said number of stages from the top of the stack to the stack frame corresponding to the respective method in which the stack frame corresponding to the respective method resides.

5. A storage medium bearing a program, said program being used for managing discarding of compiled code in a system employing JIT compilation, said program being configured to carry out the steps of:

compiling a plurality of methods using a JITcompiler, said compiling step including generating and storing a respective calling map corresponding to each of said plurality of methods, each respective calling map identifying methods which are callable from the method corresponding to the respective calling map;

determining that at least one of said plurality of methods compiled by said compiling step should be discarded;

responsive to said determining step, identifying a first subset of said plurality of methods compiled by said compiling step, each method of said first subset being an active method corresponding to a respective stack, frame in a stack, and determining a respective priority of each respective method of said first subset, said respective priority corresponding to the number of stages from the top of the stack to the stack frame corresponding to the respective method in which the stack frame corresponding to the respective method resides;

identifying a second subset of said plurality of methods compiled by said compiling step, said second subset containing methods which are callable from at least one method of said first subset, said second subset being identified by using said calling map and information concerning a method call which is actually issued for said first subset;

updating a respective activity degree of each respective method of said second subset as a function of the priority corresponding to a method of said first subset from which the respective method of said second subset is callable; and selecting at least one method of said plurality of methods compiled by said compiling step for discarding based on said activity degree of each respective method.

6. The storage medium of claim 5, wherein said calling map is configured to identify, corresponding to an index address in said method, any method which is callable from said index address onward, and identification of said second subset of methods is performed by using a respective execution restarting address of each method of said first subset as an index address for the corresponding calling map.

7. The storage medium of claim 5, wherein said JIT compiler is a JAVA JIT compiler which compiles JAVA byte code.

8. The storage medium of claim 5, wherein said priority is of the form: $K^i$, where K is a positive constant less than one, and i is said number of stages from the top of the stack to the stack frame corresponding to the respective method in which the stack frame corresponding to the respective method resides.

* * * * *